US012245357B2

(12) United States Patent
Burt et al.

(10) Patent No.: US 12,245,357 B2
(45) Date of Patent: Mar. 4, 2025

(54) COMPACT LINAC

(71) Applicant: UNITED KINGDOM RESEARCH AND INNOVATION, Wiltshire (GB)

(72) Inventors: Graeme Burt, Cheshire (GB); Boris Militsyn, Cheshire (GB); Alejandro Castilla Loeza, Cheshire (GB); Shadike Saitiniyazi, Cheshire (GB)

(73) Assignee: LANCASTER UNIVERSITY (GB)

( * ) Notice: Subject to any disclaimer, the term of this patent is extended or adjusted under 35 U.S.C. 154(b) by 119 days.

(21) Appl. No.: 18/248,634

(22) PCT Filed: Oct. 12, 2021

(86) PCT No.: PCT/EP2021/078176
§ 371 (c)(1),
(2) Date: Apr. 11, 2023

(87) PCT Pub. No.: WO2022/079028
PCT Pub. Date: Apr. 21, 2022

(65) Prior Publication Data

US 2023/0413415 A1 Dec. 21, 2023

(30) Foreign Application Priority Data

Oct. 13, 2020 (GB) ...................................... 2016200

(51) Int. Cl.

| | |
|---|---|
| ***H05H 7/02*** | (2006.01) |
| ***H05H 7/22*** | (2006.01) |
| ***H05H 9/04*** | (2006.01) |

(52) U.S. Cl.
CPC .............. *H05H 9/048* (2013.01); *H05H 7/02* (2013.01); *H05H 7/22* (2013.01); *H05H 2007/025* (2013.01)

(58) Field of Classification Search
CPC .. H05H 7/02; H05H 7/20; H05H 7/22; H05H 9/044; H05H 9/048; H05H 2007/025; H05H 2007/225; H05H 2007/227
See application file for complete search history.

(56) References Cited

U.S. PATENT DOCUMENTS

| | | | | |
|---|---|---|---|---|
| 4,975,652 | A | 12/1990 | Tronc | |
| 6,465,957 | B1 * | 10/2002 | Whitham ................ | H05H 9/04 378/65 |
| 7,339,320 | B1 * | 3/2008 | Meddaugh ............. | H05H 9/044 315/5.41 |
| 7,400,093 | B2 * | 7/2008 | Salop ...................... | H01J 35/00 315/501 |

(Continued)

FOREIGN PATENT DOCUMENTS

| | | | |
|---|---|---|---|
| CN | 105764230 | A | 7/2016 |
| EP | 2750486 | A1 | 7/2014 |
| WO | 2005065259 | A2 | 7/2005 |

*Primary Examiner* — Tung X Le

(74) *Attorney, Agent, or Firm* — Cowan, Liebowitz & Latman, P.C.; Mark Montague

(57) ABSTRACT

A linear accelerator comprises side-coupled cavity cells configured to accelerate electrons with a radio frequency field. The field amplitude in the initial cells is lower than in the later cells, and the initial cells are shorter than the later cells. This creates a capture section where electrons are captured and bunched while experiencing low acceleration, followed by an acceleration section where the bunched electrons experience stronger acceleration.

19 Claims, 2 Drawing Sheets

(56) References Cited

U.S. PATENT DOCUMENTS

| | | | | |
|---|---|---|---|---|
| 8,203,289 | B2 * | 6/2012 | Ho | H05H 9/04 315/505 |
| 10,314,157 | B1 * | 6/2019 | Carlsten | H05H 7/08 |
| 10,750,607 | B2 * | 8/2020 | Tanabe | H05H 7/18 |
| 2009/0140177 | A1 * | 6/2009 | Whittum | H05G 1/025 250/493.1 |
| 2009/0302785 | A1 * | 12/2009 | Miller | H05H 9/04 315/505 |
| 2014/0185775 | A1 | 7/2014 | Tang | |
| 2020/0187345 | A1 | 6/2020 | Tanabe | |
| 2022/0104339 | A1 * | 3/2022 | Mueller | H05H 7/04 |

* cited by examiner

COMPACT LINAC

CROSS REFERENCE TO RELATED APPLICATIONS

This is a U.S. national stage of application No. PCT/EP2021/078176, filed on Oct. 12, 2021. Priority under 35 U.S.C. § 119(a) and 35 U.S.C. § 365(b) is claimed from GB Application No. 2016200.4, filed on Oct. 13, 2020, the disclosure of which is also incorporated herein by reference.

FIELD OF THE INVENTION

The present invention relates to a linear accelerator (or linac), for example a compact linac for medical applications.

BACKGROUND TO THE INVENTION

Particle accelerators such as linacs have been used for some time, including for medical applications. For example, linacs have been used for cancer treatment since the 1950's. Presently, linacs are mainly used in X-ray therapy by accelerating particles such as electrons such that passing through a target they generate high energy X-rays which are then used to irradiate tumours. Also, accelerated electrons are used directly to irradiate tumours in electron beam therapy for superficial cancers and disease.

Linacs commonly comprise an electron source, that includes a cathode or similar to generate electrons and electron optics to collect and focus the electrons into a pulsed electron beam with energies in the keV range. The electron beam is injected into an accelerator that accelerates the electrons to energies in the MeV range. The accelerator comprises a series of cells that form a resonant cavity that is supplied with radio frequency (RF) energy to create an accelerating RF field in the cavity. The electron beam is injected into the first of the cells where it must couple with the RF field. The length of the first cell is typically a half-length cell in order for the electrons to be captured adequately forward on the RF wave. The amplitude of RF field is constant along the cavity and creates an accelerating gradient typically ranging from 10 to 30 MeV/m in medical linacs, depending on the design. To match with electron velocity, the length of the first cell is a function of velocity and in standard linac $L=\beta\lambda/2$, where $\beta$ is the ratio of particle velocity to speed of light and $\lambda$ is the radio frequency wavelength.

In a standard linac, more than 50% of the electrons injected into the first cell are lost as the linac can only capture electrons for a fraction of the RF period, typically less than 180° of all 360° phases. Electrons injected with phases outside of this capture range are either accelerated backwards (so-called back-streaming) or experience rapid radial expansion, and so are lost from the electron beam. The electrons injected with suitable phases are captured by the RF field and are accelerated, and are compressed longitudinally (bunched) to form micropulses of accelerated electrons.

Medical linacs are expensive, and this contributes to the very high cost of radiotherapy treatment. However, the cost of a linac can be reduced by making the linac more compact. Also, the cost of operation and maintenance of a linac can be reduced as well by improving the lifetime of the linac parts like the cathode and the radio frequency system.

One of the main contributions to shortened cathode lifetime is hitting of the cathode by back-streaming electrons. These are the electrons injected into the first cell at phases such that they get accelerated backwards and hit the cathode. This phenomenon is known as back bombardment, and causes an increase in the cathode temperature and electron current produced by the cathode. Also, a hot cathode, which is necessary for delivering higher current, is more likely to be poisoned, thus shortening its lifetime.

Previous attempts to mitigate the problem of back bombardment include using a deflecting magnet or a hollow cathode. However, a better approach is to increase the capture efficiency of the electrons. Linacs with higher capture efficiency have been attempted. Capture efficiencies of 60% have been reported by employing an L-band linac with a long bunching cell (the first cell of the resonant cavity), a low RF field and a focusing solenoid. However, the resulting cavity structure of the linac was 14 metres long. An even higher efficiency of 90% was reported for an S-band linac that utilized early cells in the resonant cavity structure as bunching cells, as well as a low RF field with a constant gradient, and focusing coils. The design required a total of 59 cells and resulted in a 2 metre long cavity structure to provide a 10 MeV electron beam. Hence, current approaches for increasing the capture efficiency lead to an undesirable significant increase in the size of the linac.

SUMMARY OF THE INVENTION

Against this background, and from a first aspect, the present invention resides in a linac comprising an electron source region in which is located an electron source. The electron source may comprise a cathode. The electrode source region may also comprise optics such as electrodes to assist in the formation and temporal modulation of an electron beam, for example to extract electrons, collimate electrons, or focus electrons, or any combination thereof.

The linac also comprises a cavity comprising a series of cells (also referred to as cavity cells) with each cell linked to an adjacent cell by a side chamber (also referred to as side cells, as compared to the cavity cells). The cavity is configured to accelerate electrons received from the electron source region using a RF field injected into the cells.

Hence, the linac also comprises a RF source configured to generate the RF field that is injected into the cells. The side chambers are configured to couple the RF field between the connected pair of linked cells.

The plurality of cells comprises a succession of cells extending from a first cell of the plurality of cells that receives electrons generated by the electron source to a final cell of the plurality of cells. A capture section of the plurality of cells comprises the first cell and the second cell in the succession of cells, while an acceleration section comprises the final cell and a plurality of cells immediately preceding the final cell. The length of each cell (along the longitudinal axis of the linac through the plurality of cells) in the capture section is shorter than the length of each cell in the acceleration section. The cavity is configured such that, when the RF source injects the RF field into the cells, the field amplitude in the capture section is a lower field amplitude and the field amplitude in the acceleration section is a higher field amplitude relative to the lower field amplitude in the capture section. For example, the field amplitude in the first cell may be 1/4 to 1/20 of the higher field amplitude, or the field amplitude in the first cell may be 1/5 to 1/10 of the higher field amplitude. The field amplitude in the second cell may be the same or substantially the same as the field amplitude in the first cell or may be an intermediate field amplitude between the first cell and the acceleration section.

The lower field amplitude in the capture section acts to capture and compress the electrons together in a bunch by modulating their velocity, while the field amplitude is also low enough to prevent electrons being accelerated back to the electron source. For example, the field amplitude in the first cell may be kept such, that the energy loss obtained by electrons in the first cell arriving in the deceleration phase of the RF, is at or below the injection energy of the electrons into the first cell. Advantageously, this ensures that, at most, electrons are brought to rest by the RF field, and cannot be accelerated back towards the electron source.

The acceleration section has a higher field amplitude so that the electrons are accelerated to a required energy in a shorter overall structure of the cavity and hence linac (relative to if all cells are operated with the lower field amplitude). As the electrons have a lower velocity in the capture section than a traditional linac, the cell(s) in the capture section may be shorter than in a standard linac. The length may be set to ensure that all decelerated electrons remain in the cell(s) of the capture section till the next RF cycle where they are then captured and accelerated (or may be set to increase the number of these electrons that are captured in the next RF cycle relative to conventional linacs).

Providing a step up in the RF field amplitude between the capture section and the acceleration section sees the electrons accelerated far less in the capture section than in the acceleration section. For example, electrons may be enter the capture section at or around 20 keV and leave the capture section at or around 60 keV, and then get accelerated to 1 MeV or more in the acceleration section. This means it takes longer for the electrons to pass through each cell of the capture section, and so the electrons have a longer time to be captured by the RF field either in the first cycle they encounter or the second cycle of the RF field. As the electrons enter the capture section, the spread of phases across the electrons means that around half of the electrons are phase-matched with the RF field and so get accelerated as they are picked up by the RF field. The other half of the electrons are not phase matched as they see the other half of the RF field cycle, and get decelerated. In conventional linacs, the field amplitude is high enough to decelerate the electrons and then accelerate the electrons backwards. This gives rise to the problem of back streaming electrons described above that leads to back bombardment of the electron source.

However, the lower field amplitude in the capture section of the claimed linac means that out-of-phase electrons are merely decelerated and so travel slower and for longer times in the capture section. Consequently, the out-of-phase electrons are still present during the next RF field cycle in the capture section, and are picked up and accelerated in the forward direction. These "recaptured" electrons reach the acceleration section rather than being lost as in conventional linacs. Advantageously, these recaptured electrons are bunched with some of the electrons injected into the capture section during the next RF cycle, such that all the electrons in this captured group arrive at the acceleration section at the right phase to be accelerated.

Consequently, in addition to increasing the capture efficiency of the linac, improved bunching of the electrons also results. The bunched electrons get accelerated together in the acceleration section. The net effect of the variable acceleration of the electrons in the capture section is that a 360° variation in launch phases of the electrons relative to the RF field is bunched into a 60° variation of exit phases in the electrons as they exit the capture section. The bunched electron beam gets more uniform acceleration though the acceleration section and this results in a narrower energy spread in the bunched electrons exiting the acceleration section.

However, for an optimal capture, the lower field amplitude in the capture section cannot be too low as some electrons would not experience sufficient deceleration in the capture section and thus arrive at the decelerating phases of the cells of the acceleration section. The cells of the acceleration section has the higher field amplitude and so such electrons arriving at decelerating phases would experience high backward accelerations and will be lost and cause back-bombardment.

Increasing the capture efficiency of the capture section is also beneficial as it helps reduce the number of electrons hitting the cavity walls. This, in turn, reduces unwanted harmful radiation generated by the electrons hitting the cavity walls, which requires additional shielding around the cavity and hence an increase in cost.

The reduced kinetic energy of the electrons in the capture section means that the length of each cell may be shorter than the length of each cell in the acceleration section. Also, the length of the cells in the capture section may get progressively longer. The length of all the cells of the acceleration section may be the same.

The lower field amplitude may be obtained in the capture section by altering the cell-to-cell coupling and/or by detuning the first and second cells. The cells comprising the accelerating structure form a resonant structure for the RF field. The design may be optimised to produce a particular desired RF field amplitude in the first and second cells. The field variation can be achieved by varying the cell-to-cell coupling, and the coupling between the side chamber and the first cell may be designed to assist in realising the desired field amplitude in the first cell. For example, a series of passages may link the side chambers to the cells. A first passage may couple the first side chamber to the first cell. This first passage may be of a longer relative length (in the direction along the passage from the first side chamber to the first cell) than the passages coupling the side chambers to the cells of the acceleration section. In addition, the length of a second passage that couples the first side chamber to the second cell of the capture section may have a shorter length than the first passage. A third passage may couple the second side chamber to the second cell. This third passage may be of a longer relative length than the passages coupling the side chambers to the cells of the acceleration section. Also, the passages coupling the side chambers to the cells of the acceleration section may have the same length.

For example, the ratio of the lengths of the passages from each side chamber linking cells of the capture section may be higher than the ratio of the lengths of the passages from each side chamber linking cells of the acceleration section. Hence, the ratio of the length of the first passage divided by the second side passage of the capture section may be higher than the ratio of the lengths of the first two side passages of the acceleration section.

The different lengths of the side passages coupling the first and second cells of the capture section ensures weaker coupling in the first and second cell than in the cells of the acceleration section. This weaker coupling sees a lower share of the RF field energy provided to the first and second cell than the cells of the capture section, resulting in the lower field amplitude in the first and second cell. The coupling may be made weaker in the first cell than in the second cell such that there is a lower field amplitude in the first cell than in the second cell. For example, the length of the first passage may be longer than the length of the third passage to produce a lower field amplitude in the first cell (or the ratio of the lengths of the first side passage to the second side passage that link the first side chamber to the first and second cells may be greater than the ratio of the lengths of the third side passage to the fourth side passage that link the second side chamber to the second and third cells).

The diameter of the first and second cells in the capture section may be less than the diameter of the cells in the acceleration section. The diameter may be the width of the cells transverse to the longitudinal axis through the series of cells. The diameter of the first and second cells in the capture section and the next cell which forms the start of the acceleration section may get progressively larger. The reduced diameter of the first and second cells relative to the cells of the acceleration section help tune the first and second cells. Optionally, all cells in the acceleration section have the same diameter. The diameter of the first cell may be ⅗ (or approximately ⅗) of the diameter of the cells in the acceleration section.

Other modifications may be made to reduce the field strength in the first cell. For example, the entrance aperture to the first cell may be narrower than an exit aperture of the first cell. This reduces field leakage from the first cell through the entrance aperture. Also, the entrance and exit apertures of all cells in the acceleration section may be the same size, and may be the same size as the exit aperture of the first cell. The diameter of the first cell may also be reduced to bring the first cell out of resonance. That is, a resonant field may be achieved for the first cell when the first cell has a certain length and diameter: this diameter may be deliberately reduced to bring the cell out of resonance, which will result in a lower field strength in the first cell.

Furthermore, the entrance aperture of the first cell may be located in a re-entrant section of the first cell and the exit aperture of the first cell may be located on a flat or substantially flat section of the first cell. The entrance and exit apertures of the cells in the acceleration section may be located in re-entrant sections of the respective cells. This arrangement minimises the path length of the electrons between the first and second cells, which promotes the capture of electrons (including the recapture of electrons not captured by the first cycle of the RF field they see).

The cavity and RF field is configured such that the lower field amplitude in the capture section accelerates the electrons to non-relativistic kinetic energies and the higher field amplitude in the acceleration section accelerates the electrons to relativistic kinetic energies. Optionally, the electron source is operable to provide electrons to the entrance aperture of the first cell with kinetic energies between 10 keV and 50 keV (or between approximately 10 keV and approximately 50 keV), for example the electrons may have kinetic energies of 25 keV (or approximately 25 keV). The linac may be operable such that electrons exit the cavity through the exit aperture with kinetic energies between 3 MeV and 10 MeV.

Optionally, the acceleration section may comprise more than two cells.

The cavity may further comprise an intermediate, compression section located between the capture section and the acceleration section. This compression section may comprise one or more cells with each pair of cells coupled by a side chamber. The one or more cells of the compression section may be sized and shaped such that, when the RF source injects the RF field into the cells, the field amplitude in the intermediate section may be either the same as the lower field amplitude (or approximately the same) or may be an intermediate field amplitude relative to the lower field amplitude in the capture section and the higher field amplitude in the acceleration section. The length of each cell in the intermediate section may be longer than the length of each cell in the capture section and shorter than the length of each cell in the acceleration section. The intermediate section sees decreased acceleration relative to the acceleration section. The primary function of the compression section is to increase bunching of the electrons prior to reaching the accelerating section, where the higher field amplitude sees a significant acceleration and increase in electron energy. The use of a compression section may be beneficial where higher frequency RF fields are used.

The linac may be a medical linac, for example a linac used for radiotherapy treatments.

According to a second aspect, the present invention resides in a method of accelerating electrons using any of the above linacs described above with respect to the first aspect of the invention. The method comprises injecting a RF field into the cells such that a radio frequency field with a field amplitude is created in the cells.

The method further comprises, in the electron source region, directing electrons produced by the electron source to the entrance aperture of the first cell such that the electrons enter the first cell, and coupling the electrons to the RF field in the capture section such that the coupled electrons are directed from the capture section to the acceleration section. The field amplitude in the capture section is a lower field amplitude. The method further comprises accelerating the coupled electrons in the acceleration section with the RF field. The field amplitude in the acceleration section is a higher field amplitude relative to the lower field amplitude in the capture section.

The method may include decelerating electrons in the capture section in one RF cycle and accelerating the decelerated electrons in the next RF cycle so that the electrons travel to the acceleration section. For example, electrons may be decelerated in the capture section in one RF cycle and then accelerated in the next RF cycle with other electrons arriving in the capture section during the next RF cycle, so that the electrons accelerated in the second RF cycle travel to the acceleration section together.

The method may further comprise accelerating the electrons to non-relativistic kinetic energies in the capture section and accelerating the electrons to relativistic kinetic energies in the acceleration section. The method may comprise providing the electrons to the entrance aperture of the cavity with kinetic energies between 10 and 50 keV. The method may comprise accelerating the electrons to kinetic energies between 3 and 10 MeV when they pass through the exit aperture of the cavity.

According to a third aspect, the present invention resides in a linear accelerator comprising: an electron source region in which is located an electron source; a cavity comprising a plurality of cells with each cell linked to an adjacent cell by a side chamber, wherein the cavity is configured to accelerate electrons received from the electron source region through the series of cells with a radio frequency field having an accelerating field amplitude in each of the cells; and a radio frequency source configured to generate and inject the radio frequency field into the cells, wherein the side chambers are configured to couple the radio frequency field between the connected pairs of linked cells; wherein the plurality of cells comprises a succession of cells extending from a first cell of the plurality of cells that receives electrons generated by the electron source to a final cell of the plurality of cells; the plurality of cells comprises a capture section, comprising the first cell and a second cell, and an acceleration section, comprising the final cell and a plurality of cells immediately preceding the final cell, and the length of each cell in the capture section is shorter than the length of each cell in the acceleration section; the cavity is configured such that, when the radio frequency source injects the radio frequency field into the cells, the field amplitude in the capture section is a lower field amplitude and such that the field amplitude in the acceleration section is a higher field amplitude relative to the lower field amplitude in the capture section.

In the linear accelerator according to the third aspect, the cavity may be configured such that electrons decelerated in the capture section in one radio frequency cycle are accelerated by the radio frequency field in the next radio frequency cycle and travel to the acceleration section. The cavity may be configured such that some electrons arriving in a first radio frequency cycle are accelerated and some electrons are decelerated, and such that some electrons arriving in the next radio frequency cycle are accelerated along with the electrons decelerated in the first radio frequency cycle and travel to the acceleration section together.

In the linear accelerator according to the third aspect, the length of the cells in the capture section may get progressively longer.

In the linear accelerator according to the third aspect, the length of all the cells of the acceleration section may be the same.

In the linear accelerator according to the third aspect, a pair of passages may couple each side chamber to its connected cells with one passage coupling the side chamber to one of the connected cells and the other passage coupling the side chamber to the other of the connected cells; a first side chamber may couple the first cell to the second cell; and the length of the passage between the first side chamber and the first cell may be longer than the length of each passage between the side chambers and the cells of the acceleration section. A second side chamber may couple the second cell to the third cell; and the length of the passage between the second side chamber and the second cell may be longer than the length of each passage between the side chambers and the cells of the acceleration section. Additionally or alternatively, the length of each passage between the side chambers and the cells of the acceleration section may be the same.

In the linear accelerator according to the third aspect, the first cell may comprise an entrance aperture and an exit aperture through which electrons pass when accelerated by the linear accelerator, and the entrance aperture may be narrower than the exit aperture.

In the linear accelerator according to the third aspect, the entrance and exit apertures of the cells of the acceleration section may be the same size. The entrance and exit apertures of the cells of the acceleration section may be the same size as the exit aperture of the second cell in the capture section.

In the linear accelerator according to the third aspect, wherein the entrance aperture of the first cell may be located in a re-entrant section of the first cell and the exit aperture of the first cell may be located on a flat or substantially flat section of the first cell. The entrance and exit apertures of the cells of the acceleration section may be located in re-entrant sections of the respective cells.

In the linear accelerator according to the third aspect, the cavity and radio frequency field may be configured such that the lower field amplitude in the capture section accelerates the electrons to non-relativistic kinetic energies and the higher field amplitude in the acceleration section accelerates the electrons to relativistic kinetic energies. The electron source may be operable to provide electrons to the entrance aperture of the first cell with kinetic energies between 10 and 50 key; and/or the linear accelerator is operable such that electrons exit the cavity with kinetic energies between 3 and 10 MeV.

In the linear accelerator according to the third aspect, the capture section may comprise the first and second cells, and no other cells.

In the linear accelerator according to the third aspect, the cavity may further comprise an intermediate section located between the capture section and the acceleration section; the intermediate section may comprise one or more cells with each pair of cells coupled by a side chamber; and the cavity may be configured such that, when the radio frequency source injects the radio frequency field into the cells, the field amplitude in the intermediate section is an intermediate field amplitude relative to the lower field amplitude in the capture section and the higher field amplitude in the acceleration section. The length of each cell in the intermediate section may be longer than the length of each cell in the capture section and shorter than the length of each cell in the acceleration section. Additionally or alternatively, the intermediate section comprises two cells.

According to a fourth aspect, the present invention resides in a method of accelerating electrons using the linear accelerator of any preceding claim, the method comprising: injecting a radio frequency field into the cavity such that a radio frequency field with a field amplitude is created in the cells; in the electron source region, directing electrons produced by the electron source to the entrance aperture of the first cell such that the electrons enter the first cell; coupling the electrons to the radio frequency field in the capture section such that the coupled electrons are directed from the capture section to the acceleration section, wherein the field amplitude in the capture section is a lower field amplitude; and accelerating the coupled electrons in the acceleration section with the radio frequency field, wherein the field amplitude in the acceleration section is a higher field amplitude relative to the lower field amplitude in the capture section.

The method according to the fourth aspect may comprise decelerating some electrons in the capture section in one radio frequency cycle and accelerating the decelerated electrons in the next radio frequency cycle so that the electrons travel to the acceleration section. The method may comprise decelerating some electrons in the capture section in one radio frequency cycle and accelerating the decelerated electrons in the next radio frequency cycle with other electrons arriving in the capture section during the next radio frequency cycle so that the electrons accelerated in the second radio frequency cycle travel to the acceleration section together. Additionally or alternatively, the method may comprise accelerating the electrons to non-relativistic kinetic energies in the capture section and accelerating the electrons to relativistic kinetic energies in the acceleration section. The method may comprise: providing the electrons to the entrance aperture of the first cell with kinetic energies between and 50 key; and/or accelerating the electrons to kinetic energies between 3 and 10 MeV when they exit the cavity.

According to a fifth aspect, the present invention resides in a linear accelerator comprising side-coupled cavity cells configured to accelerate electrons with a radio frequency field, wherein the field amplitude in the initial cells is lower than in the later cells and the initial cells are shorter than the later cells.

In the linear accelerator, the coupling of the RF field into the initial cells is weaker than the coupling of the RF field into the later cells. The later cells may form resonant structures, whereas the initial cells may be slightly detuned. The cavity cells may be coupled via side chambers linked to the cavity cells with passages, and the length of the passage in the initial cells may be longer than in the later cells. This provides weaker coupling between the RF field and the initial cells.

According to a sixth aspect, the present invention resides in a method of accelerating electrons using a linear accelerator comprising side-coupled cavity cells, the method comprising: providing a radio frequency field to the cavity cells such that the field amplitude in the initial cells is lower than in the later cells; and injecting electrons into the linear accelerator with a kinetic energy less than the field strength energy in the initial cells.

Further optional features will become evident to the person skilled in the art upon reading the following detailed description of the invention.

BRIEF DESCRIPTION OF THE DRAWINGS

In order that the invention can be more readily understood, reference will now be made by way of example only, to the accompanying drawings in which.

DETAILED DESCRIPTION OF THE INVENTION

The Figures show a linac 10 that comprises an electron source section, including an electron source 12, and a cavity section 14. The electron source 12 may be any type of conventional electron source 12, and so will not be described in further detail.

Figure 1:
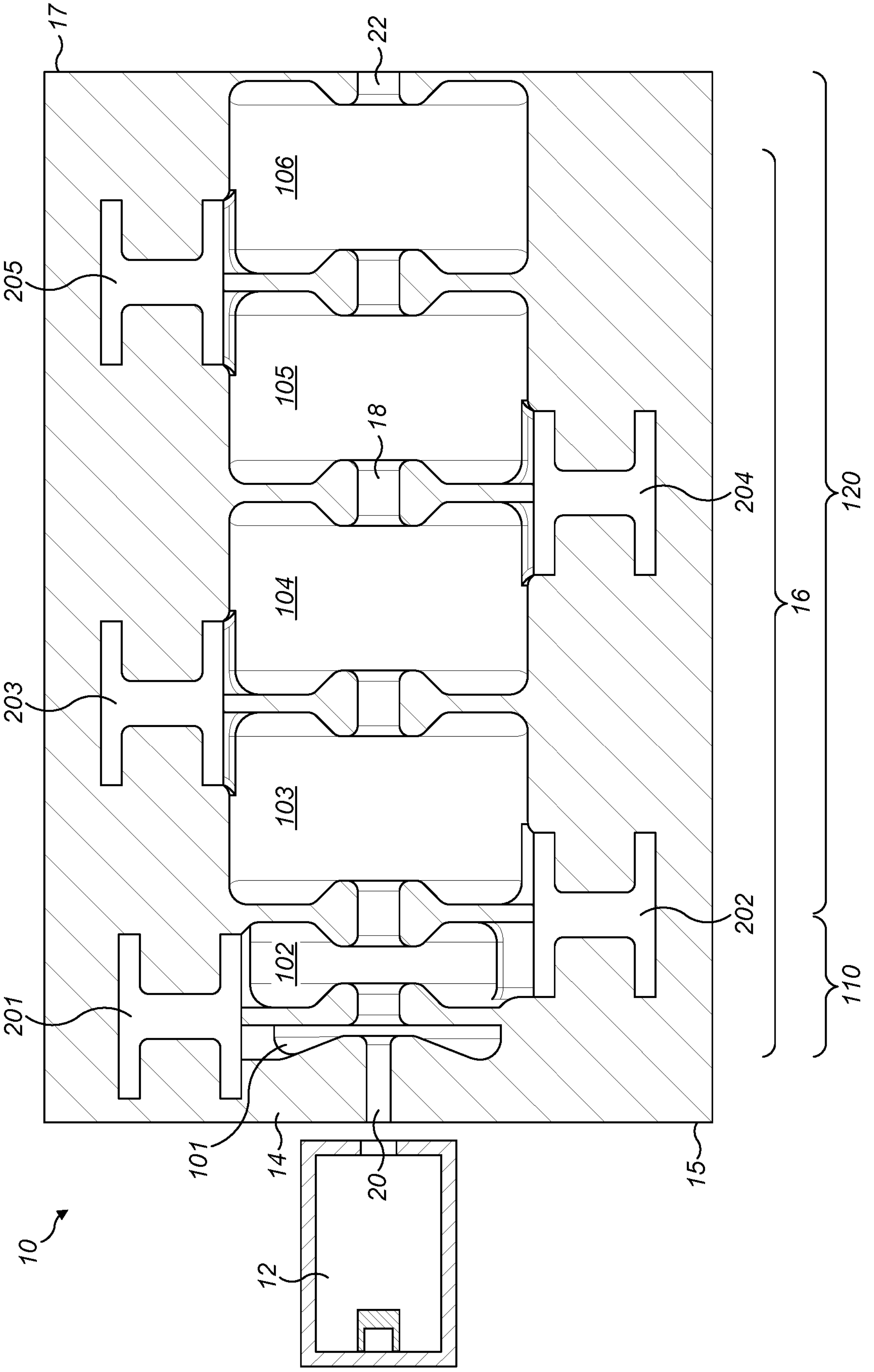
FIG. 1 is a side cross-sectional view of a linac.

The cavity section 14 includes a cavity 16 comprising a series of cavity cells 101-106 joined by a channel 18 that passes through the centre of each cavity cell 101-106. The channel 18 extends from one side 15 of cavity section 14, through an entrance aperture 20 of a first cell 101, through cells 101-106, through an exit aperture 22 of the final cell 106, and to the other side 17 of the cavity section 14. The longitudinal axis of the linac 10 extends from the centre of the entrance aperture 20 to the centre of the exit aperture 22. Electrons generated by the electron source 12 enter the cavity section 14 at the channel 18 on side 15, and exit the cavity section 14 from the channel 18 at side 17. The cavity section 14 also comprises a series of side cells 201-205. Each side cell 201-205 is positioned adjacent a pair of the cavity cells (101&102, 102&103, 103&104, 104&105, 105&106) so as to overlap with the pair of cavity cells (101&102, 102&103, 103&104, 104&105, 105&106). A passage 34 extends between each cavity cell 101-106 and each overlapping side cell (201-205) and so couple those cells (101&102, 102&103, 103&104, 104&105, 105&106). The side cells 201-205 alternate from side to side, for example alternating between being positioned above and below the cavity cells 101-106 as shown in FIG. 1.

As is well understood in the art, the side cells 201-205 are RF injection chambers that are used to couple a RF field with the cavity cells 101-106 via the passages 34. Namely, the first side cell 201 couples the RF field with the first cavity cell 101 and the second cavity cell 102 via passages 34201-101 and 34201-102, the second side cell 202 couples the RF field with the second cavity cell 102 and the third cavity cell 103 via passages 34202-102 and 34202-103, and so on. The side cells 201-205 are coupled to RF field generators that are conventional and so are not shown in the Figures, and not described further.

The cavity cells 101-106 are not of a uniform size. The third to sixth cavity cells 103-106 are of a common size and shape, and form an acceleration section 120. The first cavity cell 101 and the second cavity cell 102 have different sizes, relative to each other and also relative to the cavity cells 103-106 of the acceleration section 120. The first cavity cell 101 and the second cell 102 form a capture section 110. The second cavity cell 102 has smaller width (dimension transverse to the longitudinal axis of the linac 10) than the cavity cells 103-106 of the acceleration section 120. The first cavity cell 101 is narrower than the second cavity cell 102, which is narrower than the cavity cells 103-106 of the acceleration section 120.

The bore of the channel 18 is relatively small in its first part from the side 15 of the cavity section 14 to the entrance aperture 20. This stops the RF field leaking from the first cell 101. The bore of the channel 18 is then relatively large for each of the parts that link the subsequent cavity cells 102-106 and for the part extending from the exit aperture 22 to the side 17 of the cavity section 14. This can be seen most clearly in the detail of FIG. 2.

Each cavity 101-106 cell is approximately cylindrical in shape, and comprises a front wall $\mathbf{30}_{101}$-$\mathbf{30}_{106}$ and a back wall $\mathbf{32}_{101}$-$\mathbf{32}_{106}$. Each of the front walls $\mathbf{30}_{101}$-$\mathbf{30}_{106}$ have a central re-entrant part. The back walls $\mathbf{32}_{102}$-$\mathbf{32}_{106}$ of the cavity cells 102-106 of the acceleration section 120 also have a central re-entrant part. However, the back wall $\mathbf{32}_{101}$ of the first cavity cell 101 does not have a central re-entrant part and is flat instead, as can be seen most clearly from the detail of FIG. 2. This shortens the electron path length between the first cavity cell 101 and the second cavity cell 102.

Figure 2:
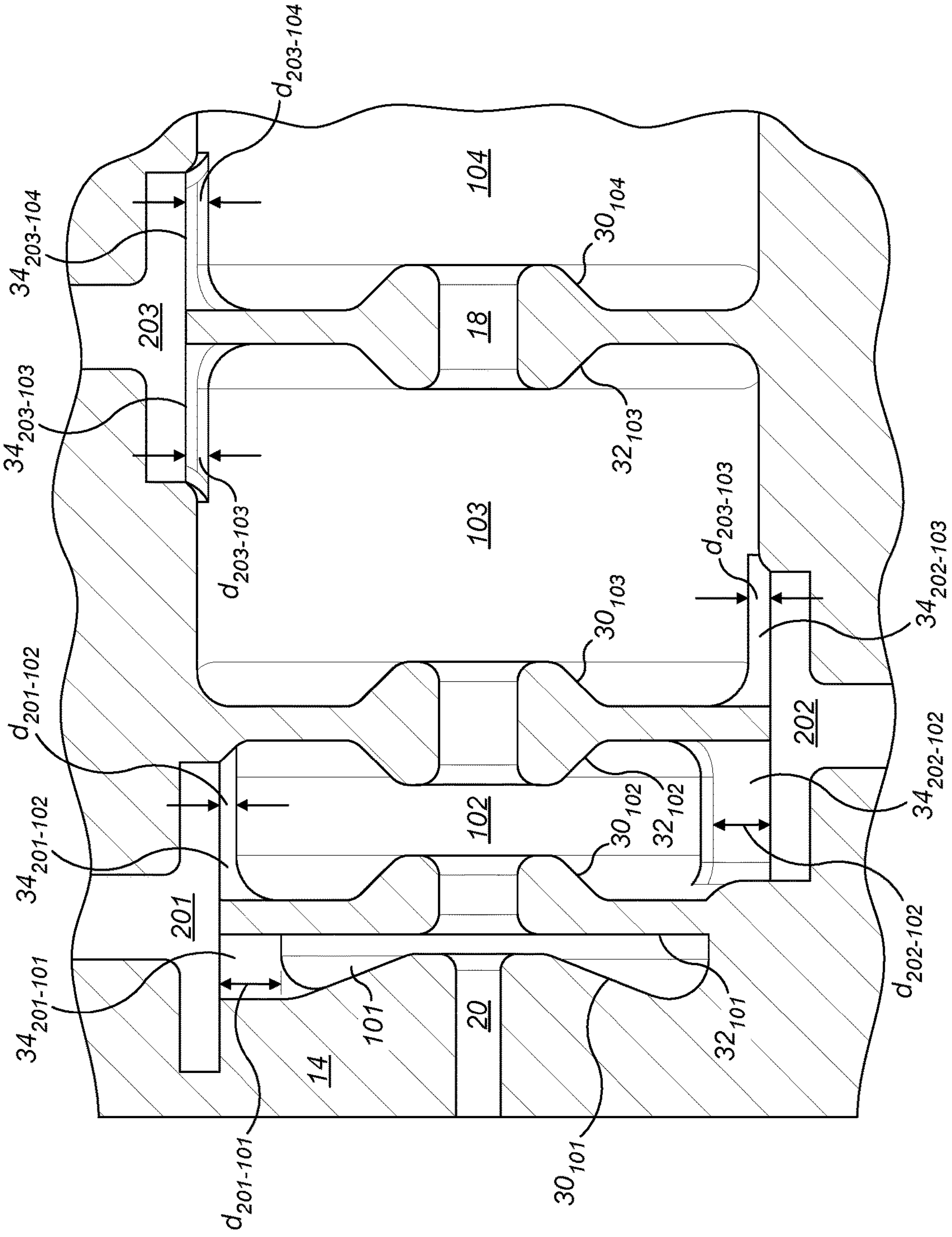
FIG. 2 is a detail of the linac of FIG. 1.

The side cells 201-205 also have a generally cylindrical shape with a cylindrical central section flanked by annular sections. The side cells 201-205 have the same size and shape, and are offset the same distance from the longitudinal axis with the exception of the first side cell 201 which is positioned closer to the longitudinal axis. Each side cell 201-205 overlaps with two cavity cells 101-106, and is coupled to each adjacent cavity cell 101-106 by respective passages 34. The smaller widths of the first and second cavity cells 101-102 means that the lengths $d_{201\text{-}101}$, $d_{201\text{-}102}$ and $d_{202\text{-}102}$ of the passages $\mathbf{34}_{201\text{-}101}$ and $\mathbf{34}_{202\text{-}102}$ coupling to the first cavity cell 101 and the second cavity cell 102 are longer than the passages 34 for the other cavity cells 103-106 (as best seen in FIG. 2; the length of a passage is the length running from the side cell to the cavity cell and hence transverse to the longitudinal axis). Moreover, the ratio of the lengths $d_{201\text{-}101}$:$d_{201\text{-}102}$ and $d_{202\text{-}102}$:$d_{202\text{-}103}$ of the passages $\mathbf{34}_{201\text{-}101}$/$\mathbf{34}_{201\text{-}102}$ and $\mathbf{34}_{202\text{-}102}$/$\mathbf{34}_{202\text{-}103}$ is larger than for the successive ratios (i.e. $d_{203\text{-}103}$:$d_{203\text{-}104}$, $d_{204\text{-}104}$:$d_{204\text{-}105}$, and so on). The longer passages $\mathbf{34}_{201\text{-}101}$ and $\mathbf{34}_{202\text{-}102}$ relative to passages $\mathbf{34}_{201\text{-}102}$ and $\mathbf{34}_{202\text{-}103}$ leads to a weaker coupling of the RF field to the first cavity cell 101 and the second cavity cell 102, thereby reducing the RF field amplitude in the first and second cavity cells 101-102.

The geometry of the cavity cells 101-106, the side cells 201-205 and the passages 34 results in a relatively high field amplitude in the cavity cells 103-106 of the acceleration section 120, and a relatively low field amplitude in the first and second cavity cells 101-102 of the capture section.

The relatively low field amplitude in the first and second cavity cells 101 and 102 ensures that electrons travel relatively slowly through the capture section 110. The relatively high field amplitude in the cavity cells 103-106 of the acceleration section 120 sees the electrons accelerate rapidly. Consequently, the lengths (dimension in the same direction as the longitudinal axis) of the cavity cells 103-106 in the acceleration section 120 is longer than the length of the cavity cell 101-102 in the capture section 110. The length of the second cavity cell 102 is longer than the first cell 101 due to the small acceleration of electrons as they pass through the first cell 101.

The electron source 12 is operated to deliver a 25 keV DC electron beam to the entrance aperture 20 of the first cell 101. The cavity 16 is operated using an S-band radio frequency field to create a π/2-mode standing wave bi-periodic side-coupled accelerator that is only 30 cm long, but that can accelerate the electrons to 6-8 MeV.

A high capture efficiency is achieved by the first and second cavity cells 101-102 having a lower field amplitude which allows most of the electrons to be captured and formed into bunches. However, using the lower RF field amplitude in all cavity cells 101-106 would make the linac 10 undesirably long as many more cavity cells 101-106 would be required. To avoid this, a step in the RF field amplitude is imposed after the first and second cavity cells 101-102 of the capture section 110. It is not straightforward to have a cavity 16 in which a low field amplitude is achieved in the capture section 110, while having the higher RF field amplitude in the cavity cells 103-106 of the acceleration section 120. As explained above, this is achieved though varying the lengths of the passages 34 to alter the RF field coupling in the first and second cells 101-102.

In order to fine-tune the RF field amplitudes achieved in the first and second cells 101-102, the first and second cells 101-102 are detuned such that the adjacent side cell 201 has finite field amplitudes. Detuning the first and second cells 101-102 sees the diameter of the first and second cells 101-102 adjusted from the values calculated to create a resonant RF field. Achieving a resonant RF field in a cavity cell 101-106 requires calculating a number of parameters that include the length and diameter of the cell. The calculated diameter may then be reduced to detune the first and second cells 101-102 out of resonance. The more detuned the first and second cavity cells 101-102, the lower the field amplitude in the first and second cavity cells 101-102 and the higher the field amplitude in the adjacent side cell 201. When the first and second cavity cells 101-102 are detuned as described above, the first side cell 201 and its passages 34 control the amplitude of the RF field in the first and second cavity cells 101-102, but the ratio of the amplitudes in the two cavity cells 101-102 stays constant hence the optimal configuration has both the first and second cavity cells 101-102 detuned. This effect may be used either in combination with varying the lengths of the passages 34, as described above, or as an alternative to varying the lengths of the passages 34.

The lower RF field amplitude in the first and second cavity cells 101-102, and the shorter lengths of the first and second cavity cells 101-102 are expected because the main function of the capture section 110 is capturing and bunching the electrons from the electron source 12, not accelerating these electrons. The RF field in the first cavity cell 101 gives little acceleration to early electrons and more acceleration to later electrons (relative to cycles of the RF field), thereby producing bunching of the electrons. However, the difference in acceleration across all the electrons cannot be too big or too small, else the bunching will be too large or too small.

The linac 10 of the Figures has been designed such that the early electrons reach 20% of the speed of light at the exit of the first cavity cell 101, while the later electrons reach 40% of the speed of light. This ensures that the later electrons catch up with the early electrons at the centre of the second cavity cell 102. Hence, bunching continues in the second cavity cell 102, as too does acceleration of the electrons. The electrons reach around 90% of the speed of light at the exit of the second cavity cell 102. As described above, the lower average speed of the electrons through the entire length of the second cavity cell 102 means that the length of the second cavity cell 102 is less than that of the cavity cells 103-106 of the acceleration section 120.

The design of the cavity cells 101-106, the side cells 201-205, the passages 34 and the resulting RF field is important for the optimal performance of the linac 10. The lower field amplitude in the first and second cavity cells 101-102 avoids back-streaming electrons and also sees far more electrons caught by the next RF cycle and so re-accelerated along the channel 18 to the second cavity cell 102. Also, the lower field amplitude in the first and second cavity cells 101-102 accelerates the electrons to travel with sub-relativistic speeds for longer, which allows them to be bunched.

However, if the field amplitude in the first cavity cell 101 is too low, two effects will reduce the capture efficiency. The first effect is space charge blow-up of the electron beam, and the second effect is under-bunching of the electrons due to insufficient velocity difference between the early and late electrons. Conversely, if the first cavity cell 101 is too long, capture efficiency will be reduced by over-bunching of the electrons. Thus, the RF field amplitudes and the lengths of first and second cavity cells 101-102 need to be scanned and optimized, which may be performed as follows.

For example, a 1D longitudinal tracking code may be used to determine a required RF field profile. Such code can simulate launching electrons at different phases, track them through the cavity 16 and record the electrons' arrival phase and kinetic energies to evaluate capture efficiency. The cavity geometry is then determined considering passage lengths, and re-entrant sections, using a separate electromagnetic code to achieve the required RF field profile.

Such 1D tracking codes may be used to optimize the lengths of the cavity cells 101-106 and the resulting RF field in the cavity cells 101-106 by assessing the arrival phases and kinetic energies of electrons as a function of the launch (emission) phase of the electrons. Inputs to the code include profile of the RF electric field, the RF field frequency, and the electron's charge, mass and initial kinetic energy. The code tracks electrons from the beginning of the RF field profile until they reach either end of the field profile. The code outputs electron phase and energy at certain positions as a function of the launch phase or each electron. This allows identification to which electrons are lost, which electrons are successfully captured and how well the electrons are bunched. Any particles that are found to travel backward and pass beyond the initial start point are marked as lost, and indicate that the design is not optimal. The code may neglect space charge effects and may only be used for initial parameter scans, but the speed and advanced methods of cell length optimization provide approximate global optimum values that may be further optimised.

The optimum length and field amplitude of each cavity cell 101-106 depends on the initial velocity particle and purpose of the cavity cell 101-106, i.e. acceleration and/or capture and bunching. The main function of the first and second cavity cells 101-102 of the capture section 110 is the capture and bunching of electrons, while giving the electrons sufficient acceleration to prevent beam blow-up due to space charge. The third and subsequent cavity cells 103-106 of the acceleration section 120 are used primarily for acceleration. The electrons are provided by the electron source 12 with 25 keV kinetic energy, which means they are not relativistic and so space charge can dominate. As the electrons are accelerated through the cavity 16, the acceleration to relativistic energies means that the cavity cell lengths need to be increased accordingly. All these may be taken into account by the 1D tracking code by varying the cavity cell lengths.

The 1D tracking optimized parameters may be used to perform further optimizations by using more precise simulation algorithms to include space charge and transverse dimensions. An example is the ASTRA algorithm (see http://www.desy.de/~mpyflo/). Several rounds of beam dynamics optimization and RF cavity modelling may be required to obtain a cavity design with high capture efficiency.

The applicant has found that, using the above method, it is possible to design an S-band linac 10, for example or use as a medical linac, with a high capture efficiency of over 90%, of which 88% particles are provided in the 6.1-8.7 MeV range. Compared to traditional medical linacs, the number of back-streaming electrons is reduced from 50% to 6.5%, which improves the electron source lifetime and the electron beam quality. The linac 10 requires less RF power, and therefore lowers the accelerator acquisition cost and the ongoing running costs.

A person skilled in the art will appreciate that the above embodiments may be varied in many different respects without departing from the scope of the present invention that is defined by the appended claims.

For example, the linac 10 has wide applicability beyond medical linacs. Any linacs that utilize a thermionic gun as an electron source can benefit from the improved capture efficiency and beam power of the present invention.

Also, the number of cavity cells 101-106 may be varied, as too may the number of side cells 201-205. The capture section 110 may comprise two (or more) cavity cells 101-106 and/or the intermediate section may comprise two (or more) cavity cells 101-106. The number of cavity cells 101-106 in the acceleration section 120 may also be varied.

The invention claimed is:

1. A linear accelerator comprising:

an electron source region in which is located an electron source;

a cavity comprising a plurality of cavity cells with each cavity cell linked to an adjacent cavity cell by a RF injection chamber, wherein the cavity is configured to accelerate electrons received from the electron source region through the series of cavity cells with a RF field having an accelerating field amplitude in each of the cavity cells; and a RF source configured to generate and inject the RF field into the cavity cells via the RF injection chambers that, are configured to couple the RF field between the connected pairs of cavity cells; wherein the plurality of cavity cells comprises a succession of cavity cells extending from a first cavity cell of the plurality of cavity cells that receives electrons generated by the electron source to a final cavity cell of the plurality of cavity cells;

the plurality of cavity cells comprises a capture section, comprising the first cavity cell and a second cavity cell, and an acceleration section, comprising the final cavity cell and a plurality of cavity cells immediately preceding the final cavity cell, and the length of each cavity cell in the capture section is shorter than the length of each cavity cell in the acceleration section;

the cavity is configured such that, when the RF source injects the RF field into the cavity cells, the field amplitude in the capture section is a lower field amplitude and such that the field amplitude in the acceleration section is a higher field amplitude relative to the lower field amplitude in the capture section;

a pair of passages couple each RF injection chamber to its connected cavity cells with one passage coupling the RF injection chamber to one of the connected cavity cells and the other passage coupling the RF injection chamber to the other of the connected cavity cells; and a first RF injection chamber couples the first cavity cell to the second cavity cell; and the length of the passage between the first RF injection chamber and the first cavity cell is longer than the length of each passage between the RF injection chambers and the cavity cells of the acceleration section.

2. The linear accelerator of claim 1, wherein the cavity is configured such that electrons decelerated in the capture section in one RF cycle are accelerated by the RF field in the next RF cycle and travel to the acceleration section.

3. The linear accelerator of claim 2, wherein the cavity is configured such that some electrons arriving in a first RF cycle are accelerated and some electrons are decelerated, and such that some electrons arriving in the next RF cycle are accelerated along with the electrons decelerated in the first RF cycle and travel to the acceleration section together.

4. The linear accelerator of claim 1, wherein the length of the cavity cells in the capture section gets progressively longer and the length of all the cells of the acceleration section is the same.

5. The linear accelerator of claim 1, wherein the ratio of the length of the passage between the first RF injection chamber and the first cavity cell divided by the length of the passage between the first RF injection chamber and the second cavity cell is greater than the ratio of the length of the passages between each RF injection chamber and its connected cavity cells.

6. The linear accelerator of claim 1, wherein a second RF injection chamber couples the second cavity cell to the third cavity cell and the length of the passage between the second RF injection chamber, and the second cavity cell is longer than the length of each passage between the RF injection chambers and the cavity cells of the acceleration section.

7. The linear accelerator of claim 6, wherein the ratio of the length of the passage between the first RF injection chamber and the first cavity cell divided by the length of the passage between the first RF injection chamber and the second cavity cell is greater than the length of the passage between the second RF injection chamber and the second cavity cell divided by the length of the passage between the second RF injection chamber and the third cavity cell.

8. The linear accelerator of claim 1, wherein the diameter of the first cavity cell relative to the length of the first cavity cell is set to detune the first cavity cell out of resonance and the diameter of the second cavity cell relative to the length of the second cavity cell is set to detune the second cavity cell out of resonance.

9. The linear accelerator of claim 1, wherein: the first cavity cell comprises an entrance aperture and an exit aperture through which electrons pass when accelerated by the linear accelerator, and wherein the entrance aperture is narrower than the exit aperture; the entrance and exit apertures of the cavity cells of the acceleration section are the same size; and the entrance and exit apertures of the cavity cells of the acceleration section are the same size as the exit aperture of the second cavity cell in the capture section.

10. The linear accelerator of claim 1, wherein the entrance and exit apertures of the cavity cells of the acceleration section are located in re-entrant sections of the respective cavity cells.

11. The linear accelerator of any preceding claim 1, wherein the cavity and RF field is configured such that the lower field amplitude in the capture section accelerates the electrons to non-relativistic kinetic energies and the higher field amplitude in the acceleration section accelerates the electrons to relativistic kinetic energies.

12. The linear accelerator of claim 11, wherein:

the electron source is operable to provide electrons to the entrance aperture of the first cavity cell with kinetic energies between 10 and 50 keV; and the linear accelerator is operable such that electrons exit the cavity with kinetic energies between 3 and 10 MeV.

13. The linear accelerator of claim 1, wherein:

the cavity further comprises an intermediate section located between the capture section and the acceleration section;

the intermediate section comprises one or more cavity cells with each pair of cavity cells coupled by a RF injection chamber; and the cavity is configured such that, when the RF source injects the RF field into the cavity cells, the field amplitude in the intermediate section is an intermediate field amplitude relative to the lower field amplitude in the capture section and the higher field amplitude in the acceleration section.

14. A method of accelerating electrons using the linear accelerator of claim 1, the method comprising:

injecting a RF field into the cavity such that a RF field with a field amplitude is created in the cavity cells;

in the electron source region, directing electrons produced by the electron source to the entrance aperture of the first cavity cell such that the electrons enter the first cavity cell;

coupling the electrons to the RF field in the capture section such that the coupled electrons are directed from the capture section to the acceleration section, wherein the field amplitude in the capture section is a lower field amplitude; and accelerating the coupled electrons in the acceleration section with the RF field, wherein the field amplitude in the acceleration section is a higher field amplitude relative to the lower field amplitude in the capture section.

15. The method of claim 14, comprising decelerating some electrons in the capture section in one RF cycle and accelerating the decelerated electrons in the next RF cycle so that the electrons travel to the acceleration section.

16. The method of claim 15, comprising decelerating some electrons in the capture section in one RF cycle and accelerating the decelerated electrons in the next RF cycle with other electrons arriving in the capture section during the next RF cycle so that the electrons accelerated in the second RF cycle travel to the acceleration section together.

17. The method of claim 14, comprising injecting the RF field into the cavity and directing electrons produced by the electron source to the entrance aperture of the first cavity cell such that that the lower field amplitude produces a field strength less than the energy at which the electrons enter the first cavity cell.

18. A linear accelerator comprising:

an electron source region in which is located an electron source;

a cavity comprising a plurality of cavity cells with each cavity cell linked to an adjacent cavity cell by a RF injection chamber, wherein the cavity is configured to accelerate electrons received from the electron source region through the series of cavity cells with RF field having an accelerating field amplitude in each of the cavity cells; and a RF source configured to generate and inject the RF field into the cavity cells via the RF injection chambers that, are configured to couple the RF field between the connected pairs of cavity cells; wherein the plurality of cavity cells comprises a succession of cavity cells extending from a first cavity cell of the plurality of cavity cells that receives electrons generated by the electron source to a final cavity cell of the plurality of cavity cells;

the plurality of cavity cells comprises a capture section, comprising the first cavity cell and a second cavity cell, and an acceleration section, comprising the final cavity cell and a plurality of cavity cells immediately preceding the final cavity cell, and the length of each cavity cell in the capture section is shorter than the length of each cavity cell in the acceleration section;

the cavity is configured such that, when the RF source injects the RF field into the cavity cells, the field amplitude in the capture section is a lower field amplitude and such that the field amplitude in the acceleration section is a higher field amplitude relative to the lower field amplitude in the capture section; and the entrance aperture of the first cavity cell is located in a re-entrant section of the first cavity cell and the exit aperture of the first cavity cell is located on a flat or substantially flat section of the first cavity cell.

19. A method of accelerating electrons using the linear accelerator of claim 18, the method comprising:

injecting a RF field into the cavity such that a RF field with a field amplitude is created in the cavity cells;

in the electron source region, directing electrons produced by the electron source to the entrance aperture of the first cavity cell such that the electrons enter the first cavity cell;

coupling the electrons to the RF field in the capture section such that the coupled electrons are directed from the capture section to the acceleration section, wherein the field amplitude in the capture section is a lower field amplitude; and accelerating the coupled electrons in the acceleration section with the RF field, wherein the field amplitude in the acceleration section is a higher field amplitude relative to the lower field amplitude in the capture section.

* * * * *